United States Patent
Hecht et al.

(10) Patent No.: US 10,201,861 B2
(45) Date of Patent: Feb. 12, 2019

(54) HOLE MACHINING TOOL AND GUIDE PAD ADJUSTMENT MECHANISM THEREFOR

(71) Applicant: Iscar, Ltd., Tefen (IL)

(72) Inventors: Gil Hecht, Nahariya (IL); Shim'on Shitrit, Kibbutz Metsuba (IL)

(73) Assignee: Iscar, Ltd., Tefen (IL)

( * ) Notice: Subject to any disclaimer, the term of this patent is extended or adjusted under 35 U.S.C. 154(b) by 237 days.

(21) Appl. No.: 15/437,620

(22) Filed: Feb. 21, 2017

(65) Prior Publication Data
US 2018/0236571 A1 Aug. 23, 2018

(51) Int. Cl.
B23B 29/00 (2006.01)
B23C 5/24 (2006.01)
(Continued)

(52) U.S. Cl.
CPC ............ B23C 5/24 (2013.01); B23B 29/03 (2013.01); B23B 51/02 (2013.01); B23B 51/0406 (2013.01); B23B 51/048 (2013.01); B23D 77/00 (2013.01); B23B 2229/04 (2013.01); B23B 2251/50 (2013.01); B23B 2251/56 (2013.01); B23B 2260/004 (2013.01); B23B 2260/146 (2013.01); B23D 2277/46 (2013.01)

(58) Field of Classification Search
CPC ... B23C 5/24; B23C 2200/56; B23C 2229/04; B23B 29/03; B23B 2251/50; B23B 2251/56; B23B 2260/004; B23B 2260/146; B23D 2277/46
See application file for complete search history.

(56) References Cited

U.S. PATENT DOCUMENTS 1,414,565 A * 5/1922 Gallagher ............ B23D 77/042
   144/230
2,189,604 A * 2/1940 Healy ..................... B23B 29/02
   408/154
(Continued)

FOREIGN PATENT DOCUMENTS

DE   2833778 A1   2/1980
DE   3314347 A1   10/1984
WO   WO 2016/165929   10/2016

OTHER PUBLICATIONS

International Search Report dated May 2, 2018, issued in PCT counterpart application (No. PCT/IL2018/050078).
(Continued)

*Primary Examiner* — Will Fridie, Jr.
(74) *Attorney, Agent, or Firm* — Womble Bond Dickinson (US) LLP (57) ABSTRACT

A hole machining tool includes an outwardly facing pad pocket and a guide pad secured therein. The pad pocket includes a pocket base surface and a wedge member which includes opposite wedge top and bottom surfaces which forming an acute wedge angle therebetween. The wedge bottom surface abuts the pocket base surface and the guide pad abuts the wedge top surface. The machining tool further includes an adjustment screw which abuts the wedge member and configured to move the wedge member along the pocket base surface. The machining tool further includes a clamping member which passes through a wedge opening in the wedge member and configured to secure the guide pad and the wedge member in the pad pocket.

21 Claims, 4 Drawing Sheets

(51) Int. Cl.
   *B23B 51/04*      (2006.01)
   *B23B 51/02*      (2006.01)
   *B23D 77/00*      (2006.01)
   *B23B 29/03*      (2006.01)

(56) References Cited

U.S. PATENT DOCUMENTS

| | | | | |
|---|---|---|---|---|
| 2,207,861 | A * | 7/1940 | Healy | B23B 29/027 |
| | | | | 408/83 |
| 4,596,498 | A * | 6/1986 | Kress | B23D 77/02 |
| | | | | 408/200 |
| 5,697,737 | A * | 12/1997 | Danielsson | B23B 51/0493 |
| | | | | 175/408 |
| 2006/0159532 | A1 * | 7/2006 | Heilmann | B23B 29/03 |
| | | | | 408/226 |
| 2010/0054879 | A1 | 3/2010 | Nedzlek | |
| 2012/0315102 | A1 * | 12/2012 | Hecht | B23B 51/00 |
| | | | | 408/227 |
| 2013/0051944 | A1 * | 2/2013 | Wenzelburger | B23B 51/0486 |
| | | | | 408/83 |
| 2013/0078045 | A1 * | 3/2013 | Randecker | B23B 51/0493 |
| | | | | 408/57 |
| 2015/0104267 | A1 * | 4/2015 | Van Doorn | B23B 51/02 |
| | | | | 408/231 |
| 2016/0243626 | A1 * | 8/2016 | Hansson | B23B 51/0493 |

OTHER PUBLICATIONS

Written Opinion dated May 2, 2018, issued in PCT counterpart application (No. PCT/IL2018/050078).

* cited by examiner

HOLE MACHINING TOOL AND GUIDE PAD ADJUSTMENT MECHANISM THEREFOR

FIELD OF THE INVENTION

The subject matter of the present application relates to static or rotating metal hole machining tools which include guide, or support, pads. Specifically, it relates to pad adjustment mechanism for hole machining tools, such as drills, reamers and/or boring tools. The present application does not relate to milling tools.

BACKGROUND OF THE INVENTION

U.S. Pat. No. 5,697,737 discloses a drill which includes a support pad.

SUMMARY OF THE INVENTION

In accordance with a first aspect of the subject matter of the present application there is provided a hole machining tool having a central longitudinal tool axis, comprising an outwardly facing pad pocket having a pocket base surface, and a guide pad secured in the pad pocket, the hole machining tool further comprising:

a pocket base surface;

a wedge member comprising opposite wedge top and bottom surfaces forming an acute wedge angle therebetween, and a wedge opening formed in the wedge member, the wedge bottom surface abutting the pocket base surface and the guide pad abutting the wedge top surface;

an adjustment screw abutting the wedge member and configured to move the wedge member along the pocket base surface; and a clamping member passing through the wedge opening and configured to secure both the guide pad and the wedge member in the pad pocket.

In accordance with a second aspect of the subject matter of the present application there is further provided a hole machining tool comprising a guide pad secured therein and an elongated tool body, the hole machining tool further comprising:

a tool peripheral surface extending between opposite clamping and machining portions, the latter comprising a cutting edge, a central longitudinal tool axis passing longitudinally through the clamping and machining portions; and a pad pocket facing away from the tool axis and comprising:

a pocket base surface;
a wedge member comprising opposite wedge top and bottom surfaces and a wedge peripheral surface extending therebetween, the wedge peripheral surface comprising an adjustment surface;
an adjustment screw configured for moving the wedge member; and
a clamping member passing through a wedge opening in the wedge member and securing the guide pad and the wedge member in the pad pocket;
wherein
the wedge bottom surface abuts the pocket base surface;
the wedge top and bottom surfaces form an acute wedge angle therebetween; and wherein
the adjustment screw abuts the adjustment surface.

In accordance with a third aspect of the subject matter of the present application there is further provided a hole machining tool comprising:

an elongated tool body having a tool peripheral surface extending between opposite clamping and machining portions, a central longitudinal tool axis passing longitudinally through the clamping and machining portions, a pad pocket formed on the tool body and facing away from the tool axis, the pad pocket having a pocket base surface;

a guide pad having pad top and bottom surfaces and a guide pad hole opening out to the guide pad top and bottom surfaces;

a wedge member comprising opposite wedge top and bottom surfaces forming an acute wedge angle therebetween, a wedge opening passing through a thickness of the wedge member and connecting the wedge top and bottom surfaces, and a wedge peripheral surface extending between the wedge top and bottom surfaces, the wedge peripheral surface comprising an adjustment surface;

an adjustment screw; and a clamping member;

wherein:

the clamping member passes through both the guide pad hole and the wedge opening, securing both the guide pad and the wedge member in the pad pocket;

the wedge bottom surface abuts the pocket base surface;

the adjustment screw abuts the adjustment surface; and rotating the adjustment screw causes the wedge member to move along the pocket base surface, and adjust a height of the guide pad, relative to the longitudinal tool axis.

Any of the following features, either alone or in combination, may be applicable to any of the aspects of the subject matter of the application:

The wedge angle can range between 3 and 13 degrees.

The wedge top surface forms an acute forward relief angle with the central longitudinal tool axis.

The forward relief angle can range between 0.1 and 0.3 degrees.

The pocket base surface forms an acute base angle with the tool axis, the pocket base angle being equal to the sum of the wedge angle and the forward relief angle.

The adjustment screw applies a force onto the wedge member which is directed towards the clamping member.

A cross-section of the hole machining tool containing the central longitudinal tool axis passes though both the adjustment screw and the clamping member.

The pad pocket can include pocket walls which extend transversely from the pocket base surface and are configured to abut and locate the guide pad.

The pocket walls can be perpendicular to the pocket base surface.

The guide pad has opposite pad top and bottom surfaces and can include at least one convex operative surface located on at least one of the top and bottom surfaces.

The clamping member can be a screw and both the adjustment screw and the clamping member, can be screw-threaded in respective threaded bores formed in the pad pocket.

The pocket walls can extend outwardly from the pocket base surface and connect with a tool peripheral surface.

The wedge member can includes an adjustment recess which accommodates the adjustment screw.

The adjustment screw can selectively move the wedge member in opposite forward and rearward directions.

The wedge member can include a receiving extension which extends transversely from one of the wedge top and bottom surfaces.

The pad pocket does not include a cartridge.

The guide pad does not include any type of cutting edge.

A method for adjusting a height of the guide pad of the hole machining tool can include the following steps:

a. unclamping the clamping member 40 while releasing the guide pad, b. rotating the adjustment screw until a desired pad height is reached, and c. tightening the clamping member to clamp the guide pad.

In yet another aspect of the subject matter of the present application, there is provided an adjustable guide pad assembly mountable in a pad pocket of a hole machining tool. The guide pad assembly comprises:

a guide pad having pad top and bottom surfaces and a guide pad hole opening out to the guide pad top and bottom surfaces;

a wedge member comprising opposite wedge top and bottom surfaces forming an acute wedge angle therebetween, a wedge opening passing through a thickness of the wedge member and connecting the wedge top and bottom surfaces, and a wedge peripheral surface extending between the wedge top and bottom surfaces, the wedge peripheral surface comprising an adjustment surface;

an adjustment screw configured to abut the adjustment surface; and a clamping member having sufficient length to extend through both the guide pad hole and the wedge opening, when the guide pad is placed atop the wedge member, with the pad bottom surface in abutment with the wedge top surface, and the guide pad hole overlapping the wedge opening.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figures 7, 8:
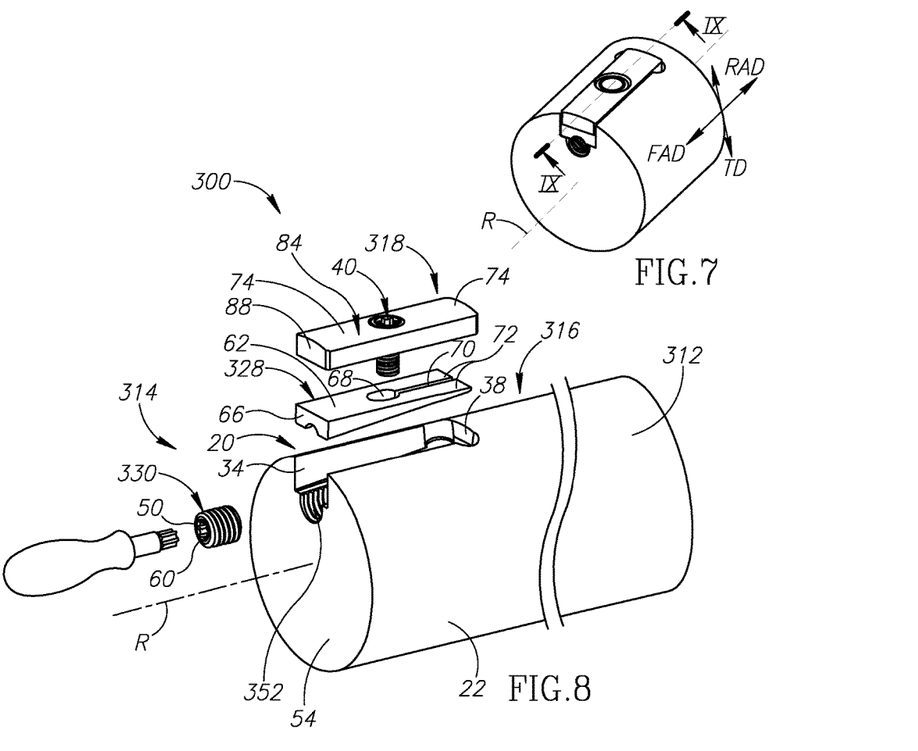
FIG. 7 is an isometric view of an embodiment of a hole machining tool in an assembled position.
FIG. 8 is an isometric view of an exploded view of the hole machining tool of FIG. 7.

A hole machining tool 100, 300 includes a clamping portion 112, 312 (only shown e.g. in FIGS. 1 and 8), an opposite machining portion 114, 314 and an elongated tool body 116, 316 which extends therebetween. The clamping portion is configured to be clamped in a machine, in an adaptor, or in an extension shank. The hole machining tool 100, 300 further includes at least one pad pocket 20 which has a height adjustment mechanism 21 and a replaceable guide pad 118, 218, 318 secured therein. The guide pad 118, 218, 318 can be indexable. The terms "machining tool", "drill", "reamer", "boring tool" all refer herein to tools configured for either creating a hole in a workpiece (by removing material), or machine an inner surface thereof. Said machining operations can be performed by a rotating machining tool which rotates with respect to a static workpiece, or vice versa. A central tool axis R is defined, which extends longitudinally, and symmetrically, throughout the tool body 116, 316 and passes through the clamping and machining portions 112, 312, 114, 314. In most applications, the tool axis R is coaxial with a virtual rotation axis about which the tool or the workpiece rotate.

As known in the field, guide, or support, pads do not cut, or remove material from the workpiece, but are configured to provide radial support, and/or improve a surface quality of the workpiece.

The tool axis R defines an axial direction AD which is parallel thereto. The tool axis R defines a radial direction RD which extends perpendicularly therefrom and is perpendicular to the axial direction AD. A tangential direction TD is defined as being perpendicular to both the axial and radial directions AD, RD. The tangential direction TD is spaced apart from the tool axis R. In other words, the tangential direction TD is tangent to a virtual cylinder which is coaxial with the tool axis R.

Three example embodiments for the pad pocket 20 and the adjustment mechanism 21 will be disclosed herein. The first and second embodiments (FIGS. 1-6) enable tool access (e.g., an adjustment "Torx" key or similar) from the 'side' of the tool—in the radial direction RD. The third embodiment (FIGS. 7-9) enables access from the 'front' of the tool—in the axial direction AD. This is advantageous in, e.g., machine turrets where accessibility from the side is problematic.

The tool body 116, 316 includes a tool peripheral surface 22 which extends along the tool axis R between the machining portion 114, 314 and the clamping portion 112, 312.

Figure 1:
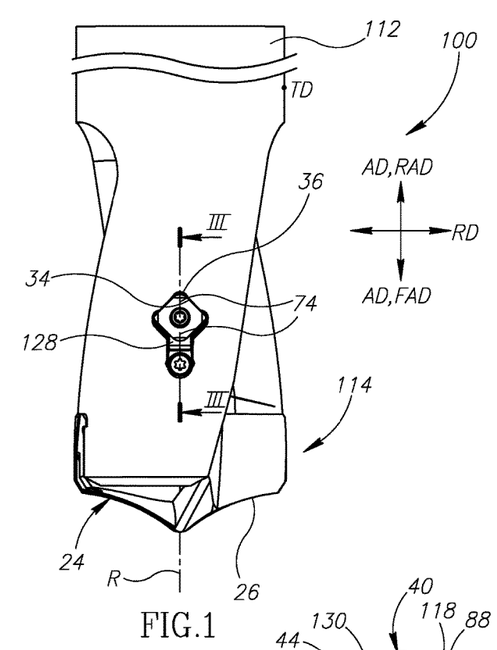
FIG. 1 is a side view of a hole machining tool in an assembled position.
Figure 2:
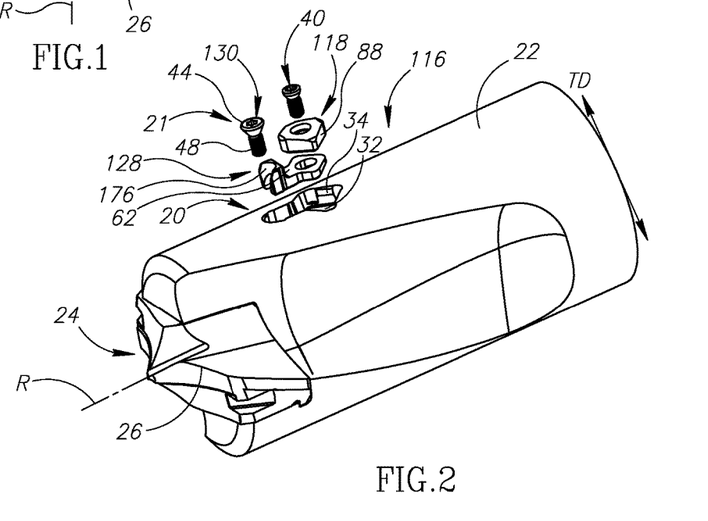
FIG. 2 is an isometric view of an exploded view of the hole machining tool of FIG. 1.

The machining portion 114 can include an integral or replaceable machining head 24. The replaceable machining head 24 has at least one cutting edge 26 and is releasably coupled to the tool body 116, 316. According to the first and second embodiments which exemplify a drill, or boring tool, the machining portion 114 can be spaced apart from the pad pocket 20 in the axial direction AD. As seen in FIG. 1, axial direction AD includes a forward axial direction FAD which is in the direction of the forward end of the tool where the machining head 24 is located and an opposite rearward axial direction RAD in the direction of the rear end of the tool where the clamping portion 112 is located. According to the third embodiment shown in FIGS. 7-9, which exemplifies a reamer, the pad pocket 20 can be located within the machining portion 314.

The pad pocket 20 can be sunk into the tool peripheral surface 22 and faces radially outwardly. The adjustment mechanism 21 is configured to adjust a radial extension RE defined as a distance between the guide pad 118, 218, 318 and the tool axis R in the radial direction RD. Generally, since the entire guide pad 118, 218, 318 is moved during adjustment, any point in the guide pad 118, 218, 318 is translated the same distance at least in the radial direction RD, however, as an example, the radial extension RE will be measured from a virtual reference plane RP. The reference plane RP can be located midway between pad top and bottom surfaces 84, 86, as will be further explained below. Depending on the application and tool size, the radial extension can reach 1 mm.

The adjustment mechanism 21 includes a wedge member 128, 228, 328 and an adjustment screw 130, 230, 330. The wedge member 128, 228, 328 is seated in the pad pocket 20 and the guide pad 118, 218, 318 is seated onto the wedge member 128, 228, 328. In the radial direction RD, the wedge member 128, 228, 328 is located between the tool axis R and the guide pad 118, 218, 318. The adjustment screw 130, 230, 330 is configured to push, or move, the wedge member 128, 228, 328 in the pad pocket 20 in the rearward axial direction RAD. As will be explained below, an angled engagement between the pad pocket 20 and the wedge member 128, 228, 328 enables the latter to accurately adjust, or alter, the abovementioned radial extension RE.

The pad pocket 20 includes a pocket base surface 32 that can be recessed with respect to the tool peripheral surface 22 and faces outwardly in the radial direction RD. The pad pocket 20 has pocket walls 34 which extend transversely therefrom and meet with the tool peripheral surface 22. The pocket walls 34 can be perpendicular to the pocket base surface 32. According to the first and second embodiments, two adjacent pocket walls 34 (located farthest from the machining portion 114 in the rearward axial direction RAD) meet at a locating corner 36 and are configured to improve accurate positioning of the guide pad 118, 218 in the pad pocket 20. According to the third embodiment, the pad pocket 20 has a rear pocket wall 38 which engages a rear portion of the guide pad 318 and serves as a stop, or locating means, in the rearward axial direction RAD. The pocket walls 34 are also configured to prevent the guide pad 118, 218, 318 from rotating about, or moving in, the radial direction RD when the wedge member 128, 228, 328 is pushed towards the pocket walls 34. Specifically, when the wedge member 128, 228, 328 moves in the rearward axial direction RAD towards the clamping portion 112, 312, the guide pad 118, 218, 318 only moves in the radial direction RD.

The pad pocket 20 further includes a clamping member 40 which is configured to secure both the guide pad 118, 218, 318 and the wedge member 128, 228, 328 in the pad pocket 20. The clamping member 40 forces the guide pad 118, 218, 318 towards the pocket base surface 32 and towards the pocket walls 34. The clamping member 40 can be a clamping screw 40. The clamping screw 40 can be screw threaded into a corresponding female thread in a clamping member bore 42 in the pocket base surface 32.

According to the first embodiment, the adjustment screw 130 has a clamping head 44 which includes a frustoconical head abutment surface 46. The adjustment screw 130 further has a cylindrical male threaded portion 48 connected to the clamping head 44. The head abutment surface 46 is configured to abut the wedge member 128. At a top end 58 of the clamping head 44, opposite the head abutment surface 46, the clamping head 44 further has a key recess 50 which, e.g., is a "Torx" key recess. The adjustment screw 130 is screw threaded into a threaded adjustment bore 152 which opens out to the pocket base surface 32 and extends in the radial direction RD.

According to the second embodiment, the adjustment screw 230 has a threaded portion 48 which is connected to a frustoconical bottom abutment surface 56. The largest diameter of the bottom abutment surface 56 is smaller than an outer diameter of the threaded portion 48. The bottom abutment surface 56 is configured to abut the wedge member 228. At a top end 58 connected to the threaded portion 48 opposite the bottom abutment surface 56, the adjustment screw 230 has a key recess 50 which, e.g., is a "Torx" key recess. The adjustment screw 230 is screw threaded into a threaded adjustment bore 252 which opens out to the tool peripheral surface 22 and extends in the radial direction RD. The adjustment bore 252 also opens out to the pad pocket 20 to allow contact between the adjustment screw 230 and the wedge member 228.

According to the third embodiment, the adjustment screw 330 has two opposite planar end abutment surfaces 60 and a threaded portion 48 which extends therebetween. The end abutment surfaces 60 are configured to abut the wedge member 318. At least one of the end abutment surfaces 60 has a key recess 50 which, e.g., is a "Torx" key recess. The adjustment screw 330 is screw threaded into a threaded adjustment bore 352 which extends in the axial direction AD and opens out to a tool front surface 54. The tool front surface 54 faces outwardly in the forward axial direction FAD. The tool front surface 54 is located in the machining portion 314. The adjustment bore 352 also opens out to the pad pocket 20 to allow contact between the adjustment screw 330 and the wedge member 328.

Figure 3:
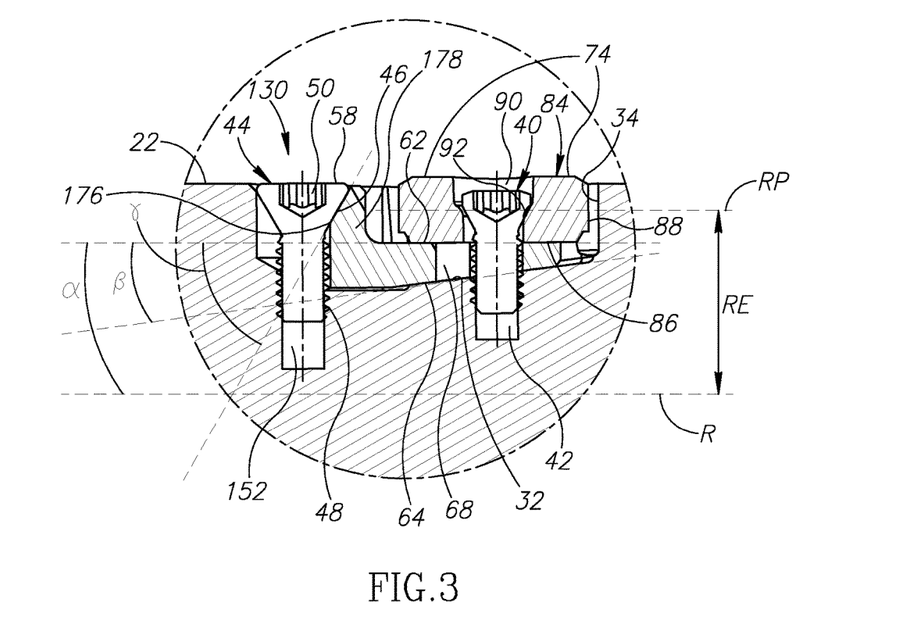
FIG. 3 is a cross-sectional view of a pad pocket taken along line III-III of FIG. 1.
Figure 4:
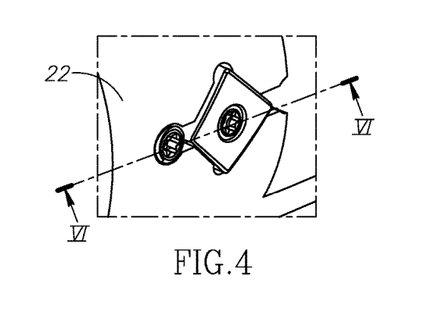
FIG. 4 is an isometric view of an embodiment of the pad pocket in an assembled position.
Figure 5:
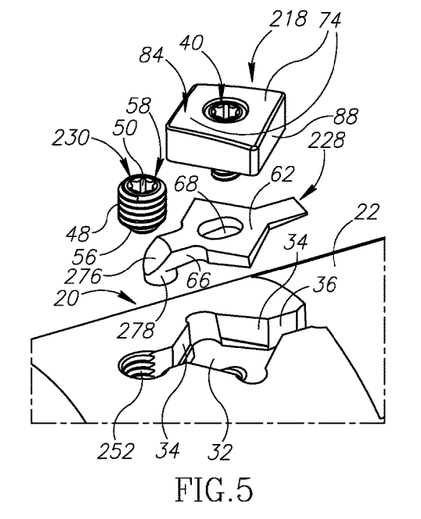
FIG. 5 is an isometric view of an exploded view of the pad pocket of FIG. 4.
Figure 6:
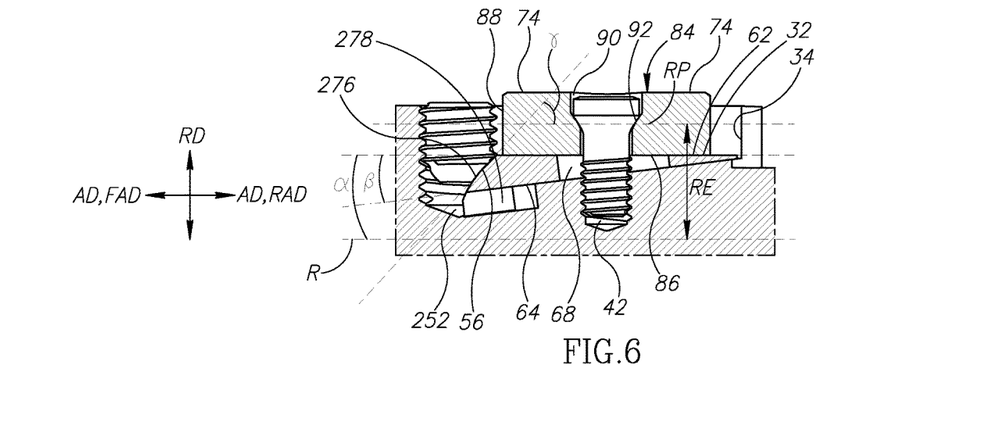
FIG. 6 is a cross-sectional view of the pad pocket taken along line VI-VI of FIG. 4.
Figure 9:
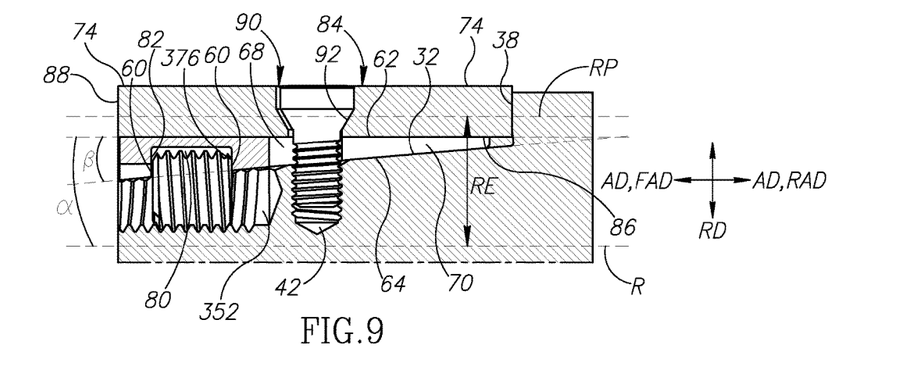
FIG. 9 is a cross-sectional view of a pad pocket taken along line IX-IX of FIG. 7.

The wedge member 128, 228, 328 has opposite wedge top and bottom surfaces 62, 64 and a wedge peripheral surface 66 which extends therebetween. The wedge top and bottom surfaces 62, 64 extend along the tool axis R and form an acute wedge angle β therebetween. The wedge angle β can range between 3 and 13 degrees, and preferably is 7 degrees. The wedge member 128, 228, 328 has an elongated wedge opening 68 which is configured to accommodate the clamping member 40 which passes therethrough. In the axial direction AD, the wedge opening 68 has a dimension larger than that of a width, or diameter, of the clamping member 40 (as seen in the cross section in FIGS. 3, 6 and 9). The wedge opening 68 passes through the wedge member and opens out at least to the wedge top and bottom surfaces 62, 64. The wedge opening 68 is elongated in the axial direction AD to allow relative movement of the clamping member 40 within the wedge member 128, 228, 328 in the axial direction AD. FIGS. 3, 6 and 9 show a space created in the axial direction between the wedge opening 68 and the clamping member 40, which enables said relative movement.

According to a third embodiment, the wedge opening 68 opens out also to the wedge peripheral surface 66. Basically, the wedge member 318 includes a flexibility slot 70 which extends between the wedge peripheral surface 66 and the wedge opening 68 and therefore creates flexible arms 72 which, when located outside the pad pocket 20 (in a relaxed position), slightly protrude from, or are wider than, the pad pocket 20 in the tangential direction TD (with respect to the pocket walls 34). When the wedge member 318 is inserted into the pad pocket 20, the flexible arms 72 are forced towards one another (causing elastic deformation and charging elastic force), which enables the arms 72 to always remain in partial contact with the pocket walls 34, preventing it from falling out of the pad pocket 20.

The wedge top surface 62 is parallel to the tangential direction TD. Put differently, the wedge top surface 62 is perpendicular to a virtual plane that passes through the tool axis R (e.g., the virtual plane can be a cross section plane, as seen in FIG. 3). In the forward axial direction FAD, the wedge top surface 62 forms a forward relief angle α with the tool axis R, as seen in an axial cross-section (FIGS. 3, 6 and 9). The guide pad 118, 218, 318 has operative surfaces 74 which are configured to engage the workpiece, but not to cut material therefrom. The forward relief angle α enables relief from the workpiece for operative surfaces 74 which are not intended for engagement with the workpiece in the current seating orientation in the pad pocket 20. In other words, regardless of how many operative surfaces 74 the guide pad 118, 218, 318 includes, the forward relief angle α enables only a single, desired operative surface 74 to engage the workpiece. The wedge top surface 62 may appear parallel to the tool axis R in a cross-section thereof, because the forward relief angle α is very small. Specifically, the forward relief angle α can have values between 0.1 to 0.3 degrees.

The wedge member 128, 228, 328 further includes an adjustment surface 176, 276, 376 configured to receive, engage the adjustment screw 130, 230, 330 and match a shape thereof. According to the present examples, the adjustment surface 176, 276, 376 is partially frustoconical. According to the first and second embodiments, the adjustment surface 176, 276 is located on a receiving extension 178, 278. According to the first embodiment, the receiving extension 178 extends transversely from the wedge top surface 62. According to the second embodiment, the receiving extension 278 extends transversely from the wedge bottom surface 64.

According to the first and second embodiments, the adjustment surface 176, 276 forms an acute adjustment angle γ with the wedge top surface 62 as seen, e.g., in a cross section in FIGS. 3 and 6. The adjustment angle γ enables the adjustment screw 130, 230 to both clamp (prevent from falling out of the pad pocket 20) and move the wedge member 128, 228.

According to the third embodiment, the wedge member 318 includes an adjustment recess 80 located in, and opening out to, the wedge bottom 64 surface. The adjustment recess 80 includes a rear adjustment surface 376 which is perpendicular to the wedge top surface 62. The adjustment recess 80 further includes a forward adjustment surface 82 which is parallel to the adjustment surface 376 and located opposite thereto. The secondary adjustment surface 82 enables the adjustment screw 330 to push the wedge member 318 in the forward axial direction FAD away from the clamping portion 312, and therefore reduces the radial extension RE.

As previously mentioned, the guide pad 118, 218, 318 has pad top and bottom surfaces 84, 86 and a pad peripheral surface 88 which extends therebetween. The guide pad 118, 218, 318 can include a through-going guide pad hole 90 which opens out to the pad top and bottom surfaces 84, 86. In an assembled position, e.g., when viewed from a plan view of the pad top surface 84, the guide pad hole 90 can be eccentric with respect to the clamping member bore 42 to enable the clamping screw 40 to force the pad 118, 218 onto/against the pocket walls 34, towards the locating corner 36 or the rear pocket wall 38. When viewed from a plan view of any of the pad top and bottom surfaces 84, 86, a projection of the guide pad 118, 218, 318 (in the same direction) has a polygonal shape. According to the first and second embodiments, the guide pad 118, 218 has a projection which is square shaped. According to the third embodiment, the projection of the guide pad 318 has a rectangular shape.

According to the first and second embodiments, the pad top surface 84 includes two diagonally opposite convex operative surfaces 74 configured to engage the workpiece. According to the third embodiment, the pad top surface 84 includes two opposite convex operative 74 surfaces configured to engage the workpiece. The operative surface 74 are all located the same distance from the reference plane RP. The pad bottom surface 86 can be at least partially planar.

In the assembled position, the wedge bottom surface 64 abuts the pocket base surface 32. According to the present embodiments, the pad bottom surface 86 abuts the wedge top surface 62. The pad peripheral surface 88 abuts the pocket walls 34. The clamping member 40 is located in both the guide pad hole 90 and the wedge opening 68. The clamping member 40 is screw threaded into the clamping member bore 42 and the head abutment surface 46 abuts a corresponding pad clamping surface 92 located in the guide pad hole 90. It can be seen from the foregoing that the clamping member 40 has sufficient length to pass through the thicknesses of both the guide pad 118, 218, 318 and the wedge member 128, 228, 328, when the guide pad is placed atop the wedge member, with the pad bottom surface 86 in abutment with the wedge top surface 62 and the guide pad hole 90 overlapping the wedge opening 68, to thereby secure both in the pad pocket 20.

The adjustment screw 130, 230, 330 is screw threaded into the adjustment bore 52 and abuts the wedge member 128, 228, 328. As seen in, e.g., the FIG. 3 cross-section, both the adjustment screw 130, 230, 330 and the clamping member 40 extend longitudinally, or are directed, in a virtual plane which intersects the tool axis R. The adjustment screw 130, 230, 330 therefore forces the wedge member 128, 228, 328 in the rearward axial direction RAD. Put differently, the adjustment screw 130, 230, 330 applies a force directed only at a middle of the wedge member 128, 228, 328, towards the clamping member 40. This ensures that no unwanted torque (that could rotate the wedge member, potentially lessening adjustment accuracy, or the final location of the operative surface 74) is applied onto the wedge member 128, 228, 328. According to the first and second embodiments, when the guide pad 118, 218 is replaced, the adjustment screw 130, 230 holds the wedge member 128, 228, and prevents it from falling out of the pad pocket 20.

When a need arises to adjust the radial extension RE, the clamping member 40 is loosened and the adjustment screw 130, 230, 330 is rotated depending on the desired direction of adjustment. Due to the wedge angle β, the adjustment screw 130, 230, 330 forces and moves the wedge member 128, 228, 328 in the axial direction AD and in the radial direction RD, along the pocket base surface 32. The pocket base surface 32 forms an acute pocket base angle, equaling α+β, with the tool axis R. As seen in the FIGS. 3, 6 and 9, the pocket base surface 32 is sloped in the forward direction of the tool, towards the tool axis R.

In the third embodiment, the adjustment screw 330 is a right-hand screw, when rotated in a clockwise direction, the adjustment screw 330 proceeds in the rearward axial direction RAD towards the clamping portion 112, 312, and therefore pushes the wedge member 328 at least in the same direction. As mentioned previously—the guide pad 118, 218, 318 abuts the pocket walls 34. Therefore, during movement of the wedge member 128, 228, 328, the guide pad 118, 218, 318 moves in the radial direction RD (away from, or towards, the tool axis R). Once the correct, or desired, radial extension RE is reached, the clamping member 40 is tightened to preserve/lock the current location of the wedge member 128, 228, 328 and the guide pad 118, 218, 318. After the clamping member 40 is tightened, the guide pad 118, 218, 318 is accurately located in a single position (and orientation) in the axial and tangential directions AD, TD. In other words, in both the axial and tangential directions AD, TD, the guide pad 118, 218, 318 is always accurately positioned, regardless of an index orientation.

Hole accuracy which can be achieved and improved by the adjustment mechanism 21 improves the stability of the machining tool, especially for cross holes and/or interrupted machining. Better stability also contributes to chatter reduction and/or vibration suppression which usually leads to noise reduction during machining. This is noticeable especially when the tool exits a machined hole.

In the third embodiment, the adjustment screw 330 enables bidirectional adjustment, which means that very little is required from the operator during adjustment of the radial extension RE.

The adjustment mechanism 21 has a small amount of parts—its therefore simple and cheap to produce. For example, no cartridges (which complicate and increase production costs) are needed.

What is claimed is:

1. A hole machining tool (100, 300) having a central longitudinal tool axis (R), an outwardly facing pad pocket (20) having a pocket base surface (32), and a guide pad (118, 218, 318) secured in the pad pocket (20), the hole machining tool further comprising:
   a wedge member (128, 228, 328) comprising opposite wedge top and bottom surfaces (62, 64) forming an acute wedge angle (β) therebetween, and a wedge opening (68) formed in the wedge member, the wedge bottom surface (64) abutting the pocket base surface (32) and the guide pad (118, 218, 318) abutting the wedge top surface (62);
   an adjustment screw (130, 230, 330) abutting the wedge member (128, 228, 328) and configured to move the wedge member (128, 228, 328) along the pocket base surface (32); and
   a clamping member (40) passing through the wedge opening (68) and configured to secure both the guide pad (118, 218, 318) and the wedge member (128, 228, 328) in the pad pocket (20).

2. The hole machining tool (100, 300) according to claim 1, wherein the wedge angle (β) ranges between 3 and 13 degrees.

3. The hole machining tool (100, 300) according to claim 1, wherein the wedge top surface forms an acute forward relief angle (α) with the central longitudinal tool axis (R).

4. The hole machining tool (100, 300) according to claim 3, wherein the forward relief angle (α) ranges between 0.1 and 0.3 degrees.

5. The hole machining tool (100, 300) according to claim 3, wherein the pocket base surface (32) forms an acute base angle with the tool axis (R), the pocket base angle being equal to the sum of the wedge angle (β) and the forward relief angle (α).

6. The hole machining tool (100, 300) according to claim 1, wherein the adjustment screw (130, 230, 330) applies a force onto the wedge member (128, 228, 328) which is directed towards the clamping member (40).

7. The hole machining tool (100, 300) according to claim 1, wherein a cross-section thereof containing the central longitudinal tool axis (R) passes though both the adjustment screw (130, 230, 330) and the clamping member (40).

8. The hole machining tool (100, 300) according to claim 1, wherein the pad pocket (20) further comprises pocket walls (34) which extend transversely from the pocket base surface (32) and are configured to abut and locate the guide pad (118, 218, 318).

9. The hole machining tool (100, 300) according to claim 8, wherein the pocket walls (34) are perpendicular to the pocket base surface (32) and are configured to accurately locate the guide pad (118, 218, 318).

10. The hole machining tool (100, 300) according to claim 1, wherein the guide pad (118, 218, 318) has opposite pad top and bottom surfaces (84, 86) and comprises a convex operative surface (74) located on at least one of the top and bottom surfaces (84, 86).

11. The hole machining tool (100, 300) according to claim 1, wherein the clamping member (40) is a screw and both the adjustment screw (130, 230, 330) and the clamping member (40), are screw-threaded in respective threaded bores formed in the pad pocket (20).

12. The hole machining tool (100, 300) according to claim 1, wherein the pad pocket (20) comprises pocket walls (34) extending outwardly from the pocket base surface (32) and connecting with a tool peripheral surface (22).

13. The hole machining tool (300) according to claim 1, wherein the wedge member (328) comprises an adjustment recess (80) which accommodates the adjustment screw (330).

14. The hole machining tool (300) according to claim 1, wherein the adjustment screw (330) is configured to selectively move the wedge member (328) in opposite forward and rearward directions.

15. The hole machining tool (100) according to claim 1, wherein the wedge member (128, 228) comprises a receiving extension (178, 278) which extends transversely from one of the wedge top and bottom surfaces (62, 64).

16. The hole machining tool (100, 300) according to claim 1, wherein the pad pocket (20) does not include a cartridge.

17. The hole machining tool (100, 300) according to claim 1, wherein the guide pad (118, 218, 318) does not include a cutting edge (26).

18. A method for adjusting a height of a guide pad (118, 218, 318) in the hole machining tool (100, 300) of claim 1, comprising:
   a. unclamping the clamping member (40) to release the guide pad (118, 218, 318),
   b. rotating the adjustment screw (130, 230, 330) until a desired pad height is reached, and
   c. tightening the clamping member (40) to clamp the guide pad (118, 218, 318).

19. A hole machining tool (100, 300) having an elongated tool body (116, 216, 316) and a guide pad (118, 218, 318) secured in the tool body, the hole machining tool (100, 300) further comprising:
   a tool peripheral surface (22) extending between opposite clamping and machining portions (112, 312, 114, 314), the latter comprising a cutting edge (26),
   a central longitudinal tool axis (R) passing longitudinally through the clamping and machining portions (112, 212, 312, 114, 214, 314);
   a pad pocket (20) facing away from the tool axis (R) and having a pocket base surface (32);
   a wedge member (128, 228, 328) comprising opposite wedge top and bottom surfaces (62, 64), a wedge opening (68) formed in wedge member, and a wedge peripheral surface (66) extending between the wedge top and bottom surfaces (62, 64), the wedge peripheral surface (66) comprising an adjustment surface (176, 276, 376);

an adjustment screw (130, 230, 330) configured for moving the wedge member (128, 228, 328); and a clamping member (40) passing through the wedge opening (68) and securing both the guide pad (118, 218, 318) and the wedge member (128, 228, 328) in the pad pocket (20);

wherein:

the wedge bottom surface (64) abuts the pocket base surface (32);

the wedge top and bottom surfaces (62, 64) form an acute wedge angle (β) therebetween; and wherein the adjustment screw (130, 230, 330) abuts the adjustment surface (176, 276, 376).

20. A hole machining tool (100, 300) comprising:

an elongated tool body (116, 216, 316) having a tool peripheral surface (22) extending between opposite clamping and machining portions (112, 312, 114, 314), a central longitudinal tool axis (R) passing longitudinally through the clamping and machining portions, a pad pocket (20) formed on the tool body (116, 216, 316) and facing away from the tool axis (R), the pad pocket having a pocket base surface (32);

a guide pad (118, 218, 318) having pad top and bottom surfaces (84, 86) and a guide pad hole (90) opening out to the guide pad top and bottom surfaces (84, 86);

a wedge member (128, 228, 328) comprising opposite wedge top and bottom surfaces (62, 64) forming an acute wedge angle (β) therebetween, a wedge opening (68) passing through a thickness of the wedge member and connecting the wedge top and bottom surfaces (62, 64), and a wedge peripheral surface (66) extending between the wedge top and bottom surfaces (62, 64), the wedge peripheral surface (66) comprising an adjustment surface (176, 276, 376);

an adjustment screw (130, 230, 330); and a clamping member (40);

wherein:

the clamping member (40) passes through both the guide pad hole (90) and the wedge opening (68), securing both the guide pad (118, 218, 318) and the wedge member (128, 228, 328) in the pad pocket (20);

the wedge bottom surface (64) abuts the pocket base surface (32);

the adjustment screw (130, 230, 330) abuts the adjustment surface (176, 276, 376); and rotating the adjustment screw (130, 230, 330) causes the wedge member (128, 228, 328) to move along the pocket base surface (32), and adjust a height of the guide pad (118, 218, 318), relative to the longitudinal tool axis (R).

21. An adjustable guide pad assembly mountable in a pad pocket (20) of a hole machining tool (100, 300), the guide pad assembly comprising:

a guide pad (118, 218, 318) having pad top and bottom surfaces (84, 86) and a guide pad hole (90) opening out to the guide pad top and bottom surfaces (84, 86);

a wedge member (128, 228, 328) comprising opposite wedge top and bottom surfaces (62, 64) forming an acute wedge angle (β) therebetween, a wedge opening (68) passing through a thickness of the wedge member (128, 228, 328) and connecting the wedge top and bottom surfaces (62, 64), and a wedge peripheral surface (66) extending between the wedge top and bottom surfaces (62, 64), the wedge peripheral surface (66) comprising an adjustment surface (176, 276, 376);

an adjustment screw (130, 230, 330) configured to abut the adjustment surface (176, 276, 376); and a clamping member (40) having sufficient length to extend through both the guide pad hole (90) and the wedge opening (68), when the guide pad is placed atop the wedge member (128, 228, 328), with the pad bottom surface (86) in abutment with the wedge top surface (62), and the guide pad hole (90) overlapping the wedge opening (68).

* * * * *